(12) United States Patent
Tsukada

(10) Patent No.: US 6,290,292 B1
(45) Date of Patent: Sep. 18, 2001

(54) SEAT BACK STRUCTURE OF HINGED VEHICLE SEAT

(75) Inventor: Mitsuru Tsukada, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/546,212

(22) Filed: Apr. 10, 2000

(51) Int. Cl.[7] .................................................. B60N 2/433
(52) U.S. Cl. .............................. 297/216.14; 297/378.12
(58) Field of Search ........................... 297/216.1, 216.13, 297/216.14, 367, 378.12

(56) References Cited

U.S. PATENT DOCUMENTS

| | | | |
|---|---|---|---|
| 5,370,440 | * 12/1994 | Regala | 297/216.14 |
| 5,509,716 | * 4/1996 | Kolena et al. | 297/216.13 |
| 5,673,971 | * 10/1997 | Wieclawshi | 297/216.14 X |
| 5,749,624 | * 5/1998 | Yoshida | 297/216.13 X |
| 5,884,972 | * 3/1999 | Deptolla | 297/216.14 X |

FOREIGN PATENT DOCUMENTS

| | | |
|---|---|---|
| 1-128639 | 9/1989 | (JP) . |
| 3-100530 | 10/1991 | (JP) . |

* cited by examiner

Primary Examiner—Peter R. Brown
(74) Attorney, Agent, or Firm—Browdy and Neimark

(57) ABSTRACT

A structure of seat back frame in a seat back of a hinged vehicle seat, in which a connecting rod is extended therein for actuating a locking mechanism in one of locking and unlocking direction. In the structure, a stopper element is provided vertically of the seat back frame at a point adjacent to a crank-like portion of the connecting rod, with an engagement element disposed between the stopper element and crank-like portion. Upon an external load being applied to a rear side of the seat back, the stopper element is thereby deformed in a direction to the crank-like portion of connecting rod and brought to engagement therewith via the engagement element, so that the connecting rod is prevented against undesired rotation in the unlocking direction.

12 Claims, 2 Drawing Sheets

SEAT BACK STRUCTURE OF HINGED VEHICLE SEAT

BACKGROUND OF INVENTION

1. Field of the Invention

The present invention relates to a seat back structure of a vehicle seat having a pair of hinged points each being defined on the respective right and left sides thereof, with a locking mechanism equipped therewith, wherein the seat back of the seat is rotatable or foldable about those hinged points relative to a seat cushion thereof. Particularly, the invent ion is directed to the seat back structure of this kind of hinged vehicle seat, wherein the seat back, when in a normal upright state, serves as a partition wall between a driver and passenger cabin section and a luggage loading section in a cabin space of a vehicle.

2. Description of the Prior Art

A vehicle with one interior space only, or a minivan or van type of automobile, is provided with one continuous spacing in its interior by combining together a cabin space where a driver and passengers can sit on their own seats and a load-carrying spaces where luggage and articles can be loaded. In this sort of vehicle or automobile, a seat back of a seat nearest to the load-carrying space (i.e. a seat back of a rear seat nearest thereto) functions as a partition wall between the cabin and load-carrying spaces.

In most cases, such seat (rear seat), whose seat back may serve as the partition wall, is of such a hinged-seat type that allows its seat back to be foldable about a hinge point relative to its seat cushion, so that a driver or passenger can fold the seat back downwardly onto the seat cushion to thereby enlarge the load-carrying space of vehicle or automobile for accommodation of a large size of luggage or article that can not be placed only in the load-carrying space limited by the seat back.

Typically, as understandable from FIG. 1, the hinged seat has a pair of hinged points (as at 16L and 16R), each being defined on the respective right and left lateral sides of seat at a juncture between the seat back and seat cushion, and is also equipped with a pair of locking mechanisms (at M and M), each being operatively coupled with those two hinged points, respectively. As known typically, a connecting rod (at 12) is connected between the pair of locking mechanisms, so that the two locking mechanisms may be operated in a synchronized manner for locking and unlocking of the seat back by applying one operative force thereto. The connecting rod is normally formed with a generally crank-like portion (at 12a). This connecting rod crank-like portion is oriented rearwardly of the seat cushion frame (26) in a relatively upward direction so as to avoid contact with a buttocks or waist portion of an occupant sitting on the seat, which can be seen from FIG. 1.

In such conventional seat back construction, however, when a great external force or load is applied to the above-stated van type of vehicle or automobile, a luggage or articles loaded in the load-carrying space will strongly clash against the rear side of seat back under the inertia, exerting an impact load upon the crank-like portion of connecting rod, with the result that the connecting rod will be rotated in an undesired unlocking direction to actuate the locking mechanism to unlock the seat back. Hitherto, to solve this problem, it has been proposed to provide a rigid cover and a reinforcing tubular member over the connecting rod to protect the same against the great impact load given from the luggage or articles. But, such cover and reinforcing members require a rigidity sufficient to withstand the great impact load, and thus will lead to a large increase of their thickness, sizes, and costs involved. Additionally, to insure the attachment of those rigid members over the connecting rod will make much complicated the peripheral fittings and seat arrangements, which might possibly impair the cushiony effect of foam padding surrounding them all, resulting in a poor seating touch thereof.

SUMMARY OF THE INVENTION

In view of the above-stated drawbacks, it is a primary purpose of the present invention to provide an improved seat back structure of hinged seat which is of a simplified and low-costed structure to prevent a connecting rod against rotation in an unlocking direction.

In order to achieve such purpose, in accordance with the present invention, a structure of seat back of hinged seat equipped with a locking mechanism, in which a connecting rod having a generally crank-like portion is operatively connected to the locking mechanism, is basically of such a construction wherein the seat back has a frontal side to support a back of an occupant sitting on the hinged seat and a rear side, in relation to a pair of lateral sides of the seat back;

wherein a seat back frame is provided within the seat back, the seat back frame having:

forward and rearward sides, each corresponding to the respective frontal and rear sides of seat back;

an upper frame section;

and a lower frame section;

wherein the generally crank-like portion of the connecting rod is positioned adjacent to the rearward side of seat back frame; and wherein a stopper means is provided at the rearward side of seat back frame adjacent to the generally crank-like portion of connecting rod and extended between the upper and lower frame sections of seat back frame, said stopper means including an engagement means, with such an arrangement that the stopper means is deformable in a direction to the generally crank-like portion by an external load applied to the rear side of seat back, to thereby bring the stopper means to an engagement relation with the crank-like portion via the engagement means, whereby the connecting rod is prevented against rotation in an unlocking direction to effect unlocking operation of the locking mechanism.

With the above-described structure, the stopper means and engagement means can easily be mounted on the seat back frame, without use of any other separate cover or reinforcing member, so as to positively prevent the undesired rotation of the connecting rod in the unlocking direction when a great external load is applied to the rear side of seat back.

In one aspect of the invention, said stopper means may be formed by joining together a first section and a second section at a predetermined point in the stopper means, the predetermined point being disposed adjacent to said crank-like portion of said connecting rod, with such an arrangement that the first section is fixed to the upper frame section of seat back frame, while the second section fixed to the lower frame section of the same, with the engagement means being defined between the predetermined point and generally crank-like portion, and that both first and second sections are deformable relative to said predetermined point in the direction to said generally crank-like portion by the external load is applied thereto. In this mode, an offset point or difference in level may preferably be defined at that predetermined point between the first and second sections in such a manner that the offset point or difference in level is brought to engagement with the generally crank-like portion of connecting rod upon deformation of the first and second sections towards the generally crank-like portion relative to the predetermined point. Preferably, the first section may be small in rigidity relative to the second section in order to positively bring the predetermined point of stopper means to engagement with the connecting rod crank-like portion via the engagement means.

All other advantages and features of the present invention will become apparent from reading of the description hereinafter, with reference to the annexed drawings.

DETAILED DESCRIPTION OF PREFERRED EMBODIMENT OF THE INVENTION

Figure 1:
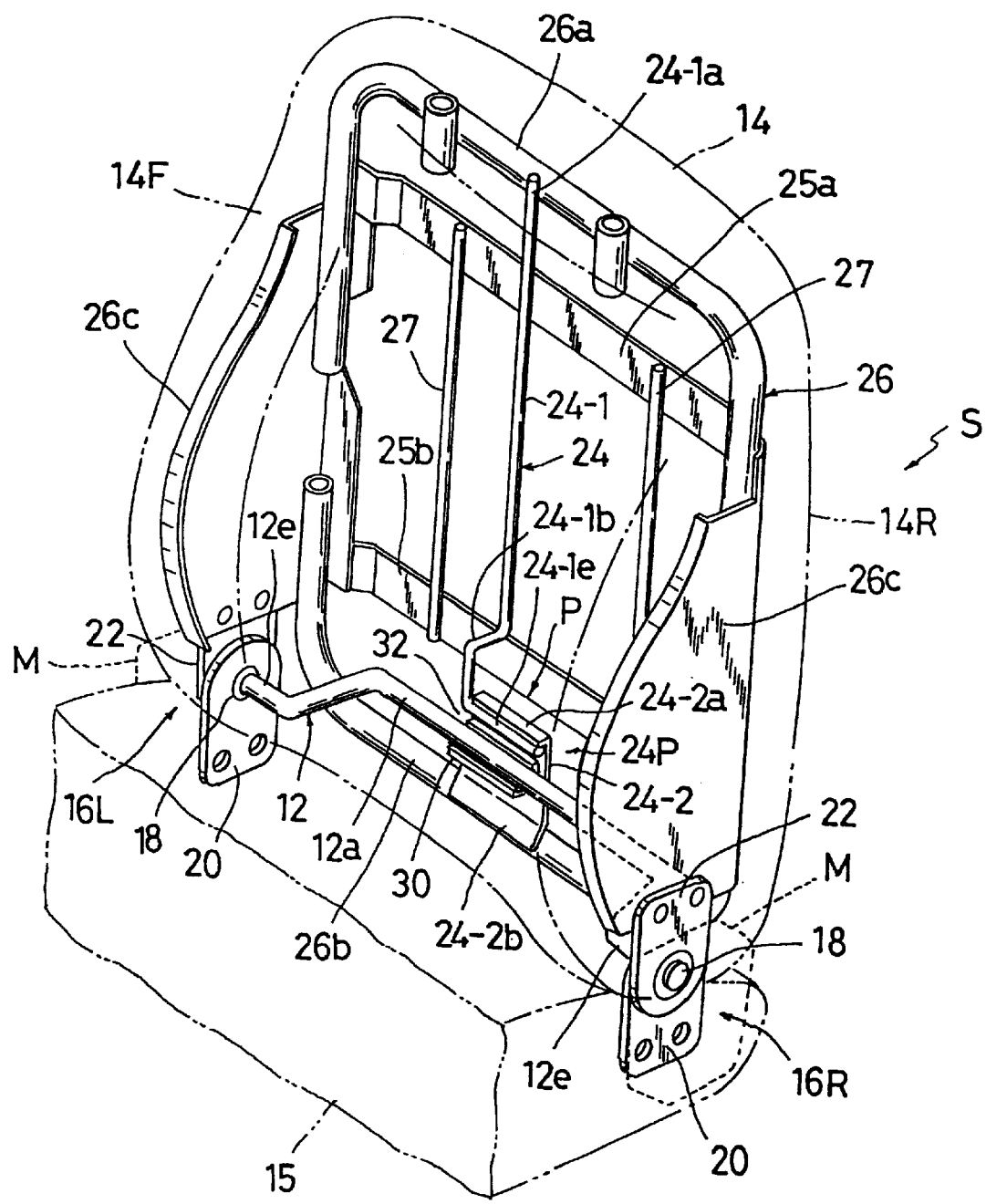
FIG. 1 is a schematic perspective view of a seat back structure in accordance with the present invention.
Figure 2:
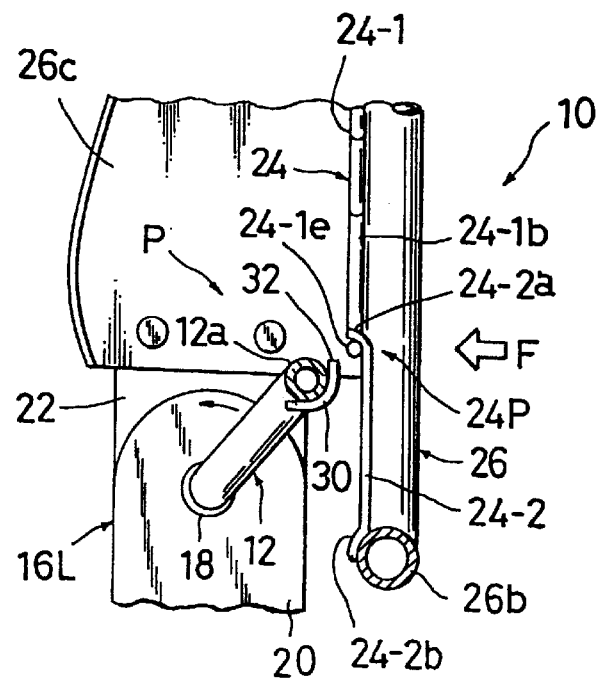
FIG. 2(A) is a partly broken, schematic side view of a principal part of the seat back structure, which shows the state where an external load is about to be applied thereto.
FIG. 2(B) is a partly broken, schematic side view of the principal part of seat back structure, which shows the state where a stopper assembly is engaged with a connecting rod via an engagement means to prevent rotation of the connecting rod.
Figure 2:
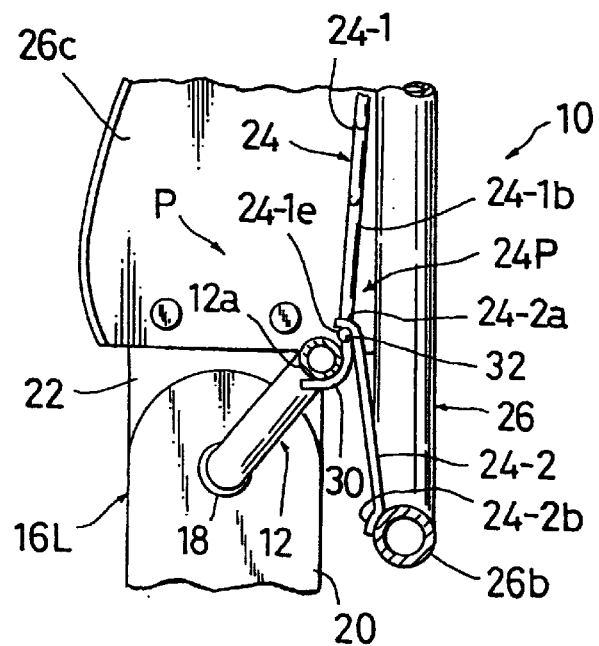

Referring to FIGS. 1, 2(A) and (2B), there is illustrated a structure of seat back of a hinged vehicle seat, as generally designated by (10), in accordance with the present invention.

A vehicle or automotive hinged seat used, for example, is shown at (S) generally as being of the known type that has been described in the description of prior art, which has a frontal side (14F) to support the back of an occupant sitting on the seat, and a rear side (14R) which is to face towards a load-carrying space (not shown). The seat back (14), when in a normal upright use, serves as a partition wall for dividing the interior space of van- or minivan-type vehicle into the cabin and load-carrying spaces therein, though not shown. As viewed from FIG. 1, the seat back (14) of this hinged seat (S) is also foldable about a pair of right and left hinge means (16R) (16L) in a direction towards and away from a seat cushion (15) of the same seat. Each of the two hinge means (16R) (16L) comprises a base plate (20) fixed to the seat cushion (15), and an upper plate (22) fixed to the corresponding lateral side of seat back frame (26) forming the seat back (14), wherein both of the plates (20) and (22) are pivotally connected together via a hinge pin (18). As is known, the connecting rod (12) is formed with a crank-like portion (12a) which is normally disposed rearwardly of the lower region of the seat back frame (26) to avoid contact with a buttocks or waist portion of an occupant sitting on the seat (S).

A pair of suitable known locking mechanisms (M) are each operatively connected to the upper and lower plates (22) (20), respectively, as indicated by the phantom lines in FIG. 1. A connecting rod (12) is firmly connected, at its two end portions (12e), to the respective two hinge pins (18) (18), thus extending between the two hinge means (16R) (16L), for synchronized operation of both two locking mechanisms (M). In this embodiment, to effect unlocking operation of one of the locking mechanisms (M) will cause anticlockwise rotation of the connecting rod (12) as indicated by the arrow in FIG. 2(A) to simultaneously transmit the likewise rotation to another of the locking mechanism (M), thereby releasing the seat back frame (26) or seat cushion (14) from a locked state.

The seat back frame (26) itself is of a known construction formed by an upper frame section (26a), a lower frame section (26b) and a pair of right and left side frames (26c) (26c) in the shown integral manner. As seen in FIG. 1, those frame sections (26a, 26b, 26c) define a three-dimensional space or depth sufficient to accommodate therein the crank-like portion (12a) of connecting rod (12) which is positioned rearwardly of the side frames (26c) when the seat back (14) is locked at its normal upright position by the locking mechanisms (M). That is, both upper and lower frame sections (26a) (26b) are set back a given distance from the crank-like portion (12a) within the seat back (14) so as to avoid interference with the rotation of that particular crank-like portion (12a). Such set-back distance of the two frame sections (26c) is one of the factors utilized in the present invention. In that sense, a pair of upper and lower support frame pieces (25a) (25b), as found typically in the seat back frame, are preferably formed such as to extend rearwardly and transversely of both upper and lower frame sections (26a) (26b). Designations (27) (27) denote a pair of support wires connected fixedly between the upper and lower support frame pieces (25a) (25b).

In accordance with the present invention, a load receiving stopper means is provided for receiving a great impact load (as indicated by the arrow (F) in FIG. 2(A)) from a luggage or articles that are thrust under inertia to the seat back frame (26) or seat back (14) and utilizing the impact load to block the previously discussed undesired unlocking of the locking mechanisms (M). A preferred mode of such stopper means may be a vertically joined stopper assembly which is generally designated by (24) and shown to be arranged in a direction vertically of the seat back frame (26). In the shown embodiment, the vertically joined stopper assembly (24) is arranged generally along the vertical central line of the seat back frame (26) such as to extend across both upper and lower frame sections (26a) (26b). Within the scopes encompassed by the invention, the stopper assembly (24) is basically formed by joining together upper and lower deformable elements at a joined point (24P), with an engagement means (as generally designated by P) defined at such joined point (24P) therebetween for engagement over the connecting rod (12), so that an external great impact load will be received by the two deformable elements which are in turn deformed to bring the engagement means (P) to engagement with the connecting rod (12), thereby preventing the connecting rod (12) against the aforementioned undesired anticlockwise rotation of connecting rod (12) in the unlocking direction.

Specifically, according to the shown embodiment of stopper assembly (24), the upper and lower deformable elements are respectively embodied by an upper wire member (24-1) and a lower plate member (24-2), both of which are bendable or deformable by an excessive great impact load given from a side rearwadly of the seat back frame (26) or seat back (14), but has a rigidity to withstand a normal degree of external impact load given from a luggage or articles as often occurred in loading and unloading it, or in a less degree of wabbling in a usual drive on the vehicle or automobile (i.e. a minivan- or van type automobile).

As viewed from FIG. 1, the upper wire member (24-1) is of a generally L-shaped configuration having a generally horizontal lower end portion (24-1e) defined at the end portion thereof. That lower end portion (24-1e) extends horizontally from the rectilinear main body of upper wire member (24-1) along the width-wise direction of seat back frame (26). Designation (24-1b) denotes a laterally bent portion defined between the horizontal axis portion (24-1e) and the rectilinear main body of upper wire member. Formation of such laterally bent portion (24-1b) advantageously allows for positioning both upper wire member (24-1) and lower plate member (24-1) at a point centrally of the seat back frame (26), as shown, which is an optimum point for effectively receiving an external load given from a luggage or article which might be thrust under the force of inertia from the load-carrying space behind the seat back frame (26). The upper wire member (24-1) has an upper end (24-1a) fixed as by welding to the upper frame section (26a) of seat back frame (26). Hence, the whole of wire member (24-1) extends vertically from the upper frame section (26a) down towards the lower frame section (26b) of the seat back frame (26), with the horizontal lower portion (24-1e) thereof disposed adjacent to the crank-like portion (12a) of connecting rod (12). It is seen that a predetermined spacing or distance is provided between the lower portion (24-1e) and crank-like portion (12a).

On the other hand, the lower plate member (24-2) is of a generally inverted-L-shaped configuration. As viewed from FIG. 1, the plate member (24-2) has a horizontally bent upper end portion (24-2a) oriented forwardly of the seat back frame (26) towards the crank-like portion (12a) of connecting rod (12), and also has a lower end portion (24-2b) fixed as by welding to the lower frame section (26b) of seat back frame (26). As shown, the lower plate member (24-2) is located generally at central point of the seat back frame (26), with the horizontally bent upper end portion (24-2a) thereof disposed adjacent to the connecting rod crank portion (12a).

Both upper wire member (24-1) and lower plate member (24-2) are joined firmly together, as by welding, at the joined point (24P); namely at their respective horizontal lower and upper end portions (24-1e) (24-2a). In this respect, the upper end portion (24-2a) associated with the lower plate member (24-2) extends in a direction to orthogonally intersect the longitudinal axis of the lower end portion (24-1e) of upper wire member (24-1), and the lower end portion (24-1e) is situated beneath the upper end portion (24-2a) and fixed to the lower inward surface of the same as best seen from FIG. 2(A). Hence, such joined point (24P) presents an offset point or difference in level between the two members (24-1) (24-2), which is situated at a level above the crank-like portion (12a) of connecting rod (12) when the connecting rod (12) is placed in a locked state by the locking mechanism (M) as shown in the figures.

As an exemplary one of the aforementioned engagement means (P), a generally L-shaped rigid engagement piece (30) may be used and fixedly attached on a local part of the crank portion (12a) of connecting rod (12). The engagement piece (30) has an upward end (32) disposed rearwardly of the connecting rod crank portion (12a), as viewed from FIGS. 1 and 2(A). The end (32) itself presents a sheer flat surface and projects a small amount upwards to a generally same level with the upper surface of crank-like portion (12a).

In this context, as previously stated earlier, the joined point (24P) of stopper assembly (24), where the upper and lower end portions (24-1e) (24-1b) are joined together, presents an offset point. This offset joined point (2P), or particularly the lower end portion (24-1e) in the present embodiment, constitutes a part of the engagement means (P) in an engageable relationship with the engagement piece (30). In other words, in the present embodiment, such offset point (24P) or the lower end portion (24-1e) provides a female engagement point, whereas the upward end (32) of engagement piece (30) provides a male engagement point in a mating engageable relation with that female engagement point. The flat surface of that end (32), when engaged with the lower end portion (24-1e), is effective in stably receiving the round outer surface of lower end portion (24-1e). This engageable relation will block rotation of the connecting rod (12), as will be described later.

The engagement means (P) is not limited to the engagement pieces (30), and instead thereof, the connecting rod crank-like portion (12a) per se may be used as a part of the engagement means (P) for direct engagement with the foregoing offset joined point (24P) or the lower end portion (24-1e) of upper wire member (24) In this case, a flat engagement region is preferably formed in the crank-like portion (12a) for a positive engagement with that point (24P). With the above-described construction, a great external load applied to a vehicle or automobile with a seat having the stopper assembly (24) therein, in a forward collision case for instance, causes a luggage or articles placed in the load-carrying space of the vehicle behind the seat back (14) to be thrust strongly under inertia in the forward direction to the rear side of seat back (14) or seat back frame (26) and clashed against the vertically joined stopper assembly (24), applying a great impact load (F) thereto in the direction forwardly of the seat back frame (26), as shown in FIG. 2(A). If this forward impact load (F) exceeds the rigidity of the stopper assembly (24), both upper and lower elements (24-1) (24-2) of the stopper assembly (24) are deformed or bent in the same forward direction relative to the joined point (24P), with the result that the joined point or the lower end portion (24-1e) of upper wire member (24-1) is brought to engagement over the upward end (32) of engagement piece (30) fixed to the connecting rod crank-like portion (12a), thereby placing the connecting rod (12) in a locked state, as shown in FIG. 2(B). Consequently, the forward great impact (F) attempting to rotate the connecting rod (12) in the unlocking direction (as indicated by the arrow in FIG. 2(A)) is positively blocked by such engagement between the connecting rod crank-like portion (12a) and the joined point (24P) of stopper assembly (24). In this regard, to assure this engagement, it is desirable that the upper wire member (24-1) be small in rigidity relative to the lower plate member (24-2). This rigidity deference is effective for positively causing an intensive deformation or bending only in the joined point (24P), whereby both two members (24-1) (24-2) may be deformed in a balanced proportion to only project such joined point (24P) in a direction toward the engagement piece (30). In this connection, It is preferable that either of the engagement pieces (30) and crank-like portion (12a) should be situated generally at a point in the circumference of a circle along which the joined point (24P) is to be bent and rotated relative to the lower frame section (26b) of seat back frame (26). Also, the joined point (24P) be located above and spaced apart a predetermined distance from the engagement piece upward end (32), allowing for the foregoing engagement.

Accordingly, it is to be appreciated that the stopper means or the stopper assembly (24) can easily be mounted in a partial or local area of the seat back frame (26) adjacently behind the connecting rod (12) by simply fixing its upper and lower end portions (24-1a) (24-2b) to the respective upper and lower frame sections (26a) (26b) of the seat back frame (26). Since the stopper assembly (24) has only to be provided with a certain rigidity with a deformable property as noted above, its structure may be made as small as possible with much simplified mode, as shown. Therefore, any other separate high rigid member, such as a cover or reinforcing tubular member, does not need to be fitted thereto, thus avoiding increase of the weight and size of seat back (14) and costs involved in the assembly thereof.

It is also appreciated that the vertical arrangement of both stopper means (24) and engagement means (P) along the height-wise direction of seat back frame (26) has no adverse effect on the cushiony touch of an upholstery surrounding them in the seat back (14), and that, normally, a predetermined spacing is provided at the engagement point (at P) between the stopper means (24) and connecting rod crank-like portion (12a), thereby permitting free rotation of the connecting rod (12) for desired locking and unlocking operation of the locking mechanism (M) with regard to the seat back (14).

In place of the joined mode described above, the stopper means (at 24) may be embodied by a continuous vertical unit, such as one vertical wire member or one vertical plate member, without a joined point (24P) defined therein, because the stopper means per se within the scopes of the present invention is not limited to the illustrated mode of stopper means, and basically requires provision of an engagement means equivalent to such engagement point (at P) as the lower end portion (24-1e) or offset point (at 24P) and the engagement piece (30). Thus, for example, one wire stopper member of a certain rigid and deformable property as discussed earlier may be fixedly connected between the upper and lower frame sections (26a) (26b) of seat back frame (26), with a suitable engagement piece fixed on that wire stopper member, in such a manner that the engagement piece is normally spaced apart from the connecting rod crank-like portion (12a), but will be brought to engagement therewith when the wire stopper member is deformed under a great impact load (F).

The engagement means (P) may be embodied by a pair of toothed members, each being equivalent to the offset joined point (24P) and the engagement piece (30), respectively, such that one of the two toothed members fixed at the former (24P) is normally spaced apart a predetermined distance from another of them, and will be brought in mesh therewith when the stopper means (24) is deformed under a great impact load (F).

Of course, the seat back structure of the present invention is applicable to the type of hinged seat wherein the rotational direction of connecting rod (12) is clockwise, in contrast to the anticlockwise rotation of the rod (12) in above-described embodiment, for unlocking operation.

In that case, the engagement means (P) may be defined at a point below the connecting rod crank-like portion (12a). Namely, the joined point (24P) or the under end portion (24-1e) of upper wire member (24-1) may be disposed at a level below that crank-like portion (12a) such that they are to be brought to engagement with a part of the crank-like portion (12a) or the engagement piece (30).

The present invention is also applicable to various types of hinged seat for use with a train, airplane and vessel or other kinds of vehicles.

While having described the present invention thus far, it should be understood that the invention is not limited to the illustrated embodiment, but any other modifications, replacements and additions will be structurally applied thereto without departing from the scopes of the annexed claims.

What is claimed is:

1. In a seat back of a hinged seat for use in a vehicle, which includes a pair of hinge means, each being provided at a pair of lateral sides of the hinged seat, respectively, to allow rotation of the seat back thereabout, a pair of locking mechanisms for locking and unlocking the seat back, said pair of locking mechanisms being each provided at the respective said pair of hinge means, and a connecting rod with a generally crank-like portion defined therein, said connecting rod being so provided within the seat back as to extend between said pair of hinge means, wherein operating one of said pair of locking mechanisms in an unlocking direction causes said connecting rod to rotate in a same direction with said unlocking direction so as to cause simultaneous unlocking operation of both said pair of locking mechanisms, a structure of said seat back wherein
said seat back has a frontal side to support a back of an occupant sitting on the hinged seat and a rear side, in relation to said pair of lateral sides;
wherein a seat back frame is provided within said seat back, said seat back frame having: forward and rearward sides, each corresponding to the respective said frontal and rear sides of said seat back; an upper frame section; and a lower frame section;
wherein said generally crank-like portion of said connecting rod is positioned near to said rearward side of the seat back frame; and
wherein a stopper means is provided at said rearward side of the seat back frame adjacent to said generally crank-like portion of the connecting rod and extended between said upper and lower frame sections of said seat back, said stopper means including an engagement means, with such an arrangement that said stopper means is deformable in a direction to said generally crank-like portion of the connecting rod by an external load applied to said rear side of the seat back, to thereby bring the stopper means to an engagement relation with said crank-like portion via said engagement means, whereby said connecting rod is prevented against rotation in said unlocking direction.

2. The structure as defined in claim 1, wherein said stopper means and engagement means are disposed away from said crank-like portion of the connecting rod by a distance permitting for free rotation of the connecting rod unless said stopper means is deformed in the direction by said external load.

3. The structure as defined in claim 1, wherein said stopper means has a certain rigidity, but it is deformable in the direction to said generally crank-like portion of said connecting rod if said external impact load exceeds said rigidity.

4. The structure as defined in claim 1, wherein said engagement means comprises an engagement member provided on said stopper means, and wherein, said engagement member is brought to engagement with said generally crank-like portion of the connecting rod when said stopper means is deformed in said direction by said external load.

5. The structure as defined in claim 1, wherein said engagement means comprises a first engagement member provided on said stopper means and a second engagement member provided on said generally crank-like portion of the connecting rod, and wherein said first engagement is brought to engagement with said second engagement member when said stopper means is deformed in said direction by said external load.

6. The structure according to claim 5, wherein said first engagement member is spaced apart from said second engagement member by a distance allowing for free rotation of said connecting rod unless said stopper means is deformed in the direction by said external load.

7. The structure as defined in claim 1, wherein said stopper means comprises a first section and a second section, wherein said first and second sections are joined together at a predetermined point adjacent to said generally crank-like portion of said connecting rod, with such an arrangement that the first section is fixed to said upper frame section, while the second section fixed to said lower frame section, with said engagement means being defined between said predetermined point and said generally crank-like portion, and that both said first and second sections, when acted on by the external load, are deformed relative to said predetermined point in the direction to said generally crank-like portion.

8. The structure according to claim 7, wherein an offset point or difference in level is defined at said predetermined point between said first and second sections in such a manner that, upon deformation of the first and second sections by the external load applied thereto, said offset point or difference in level is brought to engagement with said generally crank-like portion of the connecting rod via said engagement means.

9. The structure according to claim 7, wherein said first section is small in rigidity relative to said second section.

10. The structure according to claim 7, wherein said first section comprises a wire member having a vertically extending main wire body and one end portion fixed to said upper frame section, wherein said second section comprises: a plate member of a generally inverted-L-shaped configuration having a vertical main body fixed to said lower frame section; and a horizontal end portion extending horizontally from said vertical main body, said horizontal end portion having a lower side, wherein said engagement means comprises another end portion of said wire member which is bent horizontally from said vertically extending main wire body, and wherein said another end of the wire member is fixed to said lower side of said horizontal end portion of said plate member at said predetermined point adjacent to said generally crank-like portion of the connecting rod.

11. The structure according to claim 10, wherein said engagement means further comprises an engagement piece fixed on said generally crank-like portion of the connecting rod, said engagement piece having a flat end surface which is to receive and engage said horizontal end portion of said plate member.

12. In a seat back of a hinged seat for use in a vehicle, which includes a pair of hinge means, each being provided at a pair of lateral sides of the hinged seat, respectively, to allow rotation of the seat back thereabout, a pair of locking mechanisms for locking and unlocking the seat back, said pair of locking mechanisms being each provided at the respective said pair of hinge means, and a connecting rod with a generally crank-like portion defined therein, said connecting rod being so provided within the seat back as to extend between said pair of hinge means, wherein operating one of said pair of locking mechanisms in an unlocking direction causes said connecting rod to rotate in a same direction with said unlocking direction so as to cause simultaneous unlocking operation of both said pair of locking mechanisms, a structure of said seat back wherein said seat back has a frontal side to support a back of an occupant sitting on the hinged seat and a rear side, in relation to said pair of lateral sides;

wherein a seat back frame is provided within said seat back, said seat back frame having: forward and rearward sides, each corresponding to the respective said frontal and rear sides of said seat back; an upper frame section; a lower frame section; and a pair of lateral frame sections;

wherein said generally crank-like portion of said connecting rod is positioned adjacent to said lower frame section of said seat back frame;

wherein said lower frame section of said seat back frame is disposed rearwardly of said pair of lateral frame sections of said seat back frame so that said seat back frame, at the lower region thereof, accommodates therein said generally crank-like portion of the connecting rod without interference therewith; and wherein a stopper means is provided within said seat back such as to extend between said upper and lower frame sections of said seat back, said stopper means including an engagement means defined at said lower region of the seat back frame, with such an arrangement that said stopper means is deformable in a direction to said generally crank-like portion of said connecting rod by an external load applied to said rearward side of the seat back, to thereby bring the stopper means to an engagement relation with the crank-like portion via said engagement means, whereby said connecting rod is prevented against rotation in said unlocking direction.

* * * * *